US012802474B2

(12) United States Patent
Bathory-Frota et al.

(10) Patent No.: US 12,802,474 B2
(45) Date of Patent: Nov. 17, 2026

(54) COLLECTING IMAGES AND METADATA OF FAKE IDENTIFICATION DOCUMENTS IN DATABASE AND PROVIDING ACCESS THERETO BY OTHER ENTITIES FOR VARIETY OF APPLICATIONS

(71) Applicant: Servall Data Systems Inc., Calgary (CA)

(72) Inventors: Alberio Bathory-Frota, Calgary (CA); James Edward Marusiak, Sanford, FL (US); Tristan Neal Hasselback, Calgary (CA); John David Brandt, Calgary (CA)

(73) Assignee: Servall Data Systems, Inc., Calgary (CA)

( * ) Notice: Subject to any disclaimer, the term of this patent is extended or adjusted under 35 U.S.C. 154(b) by 496 days.

(21) Appl. No.: 18/342,000

(22) Filed: Jun. 27, 2023

(65) Prior Publication Data

US 2024/0005684 A1 Jan. 4, 2024

Related U.S. Application Data

(60) Provisional application No. 63/356,721, filed on Jun. 29, 2022.

(51) Int. Cl.

*G06V 20/00* (2022.01)
*G06F 16/953* (2019.01)
*G06V 10/94* (2022.01)
*G06V 30/41* (2022.01)

(52) U.S. Cl.

CPC ............ *G06V 20/95* (2022.01); *G06F 16/953* (2019.01); *G06V 10/945* (2022.01); *G06V 30/41* (2022.01); *G06V 2201/10* (2022.01)

(58) Field of Classification Search

CPC .................................................... G06Q 50/265
See application file for complete search history.

(56) References Cited

U.S. PATENT DOCUMENTS 7,804,982 B2 * 9/2010 Howard .................. G06F 16/93 382/117
10,242,259 B2 * 3/2019 Hagelin ............. G06Q 20/4014
11,538,264 B2 * 12/2022 Bathory-Frota ..... G06V 30/414
(Continued)

*Primary Examiner* — Akwasi M Sarpong
*Assistant Examiner* — Michael L Burleson
(74) *Attorney, Agent, or Firm* — Noblitt & Newson, PLLC

(57) ABSTRACT

A system for collecting fake identification documents includes a central controller coupled to scanners and external systems. The scanners scan identification documents and report images of fake or suspected fake identification documents to the central controller. Documents may be automatically detected as fake by matching against known fake ID templates or by detecting that information extracted from the document appears manufactured or incorrect. Documents may also be manually flagged as suspicious by scanner operators either on-the-fly during routine scanning or in batch operations. Scanned documents may further be sent from scanner to central controller during audit events. The central controller enables human review if desired, and, when reported documents are confirmed to be fake, images of the fake IDs along with metadata thereof are added to a fake ID database. The external systems are then notified and may retrieve fake ID templates from the database for a variety of applications.

15 Claims, 5 Drawing Sheets

(56) References Cited

U.S. PATENT DOCUMENTS

| | | | | |
|---|---|---|---|---|
| 2003/0195859 | A1* | 10/2003 | Lawrence | G06Q 20/02<br>705/75 |
| 2004/0213437 | A1* | 10/2004 | Howard | G06F 16/93<br>707/999.009 |
| 2004/0236688 | A1* | 11/2004 | Bozeman | G06Q 20/26<br>705/42 |
| 2007/0130327 | A1* | 6/2007 | Kuo | H04L 63/1491<br>709/224 |
| 2008/0300877 | A1* | 12/2008 | Gilbert | G06Q 20/40<br>704/E15.001 |
| 2009/0055915 | A1* | 2/2009 | Piliouras | G06F 21/41<br>726/8 |
| 2013/0283375 | A1* | 10/2013 | Kuo | H04L 63/1491<br>726/22 |
| 2016/0005050 | A1* | 1/2016 | Teman | G06Q 30/018<br>705/317 |
| 2016/0104041 | A1* | 4/2016 | Bowers | G07D 7/12<br>382/115 |
| 2016/0335520 | A1* | 11/2016 | Ross | G06V 30/412 |
| 2018/0218158 | A1* | 8/2018 | Amano | H04L 12/40006 |
| 2020/0184212 | A1* | 6/2020 | Anthony Samy | G06N 3/0895 |
| 2021/0004581 | A1* | 1/2021 | Bathory-Frota | G06V 30/413 |
| 2021/0034861 | A1* | 2/2021 | Roebuck | G06V 30/418 |
| 2021/0049358 | A1* | 2/2021 | Jarvis | G06V 20/95 |
| 2021/0103760 | A1* | 4/2021 | Ross | H04L 9/3247 |
| 2021/0334798 | A1* | 10/2021 | Mossoba | G06Q 20/401 |
| 2022/0414370 | A1* | 12/2022 | Pribble | G06V 10/44 |
| 2023/0245487 | A1* | 8/2023 | Patil | G06V 30/413<br>382/112 |

* cited by examiner

COLLECTING IMAGES AND METADATA OF FAKE IDENTIFICATION DOCUMENTS IN DATABASE AND PROVIDING ACCESS THERETO BY OTHER ENTITIES FOR VARIETY OF APPLICATIONS

CROSS-REFERENCE TO RELATED APPLICATIONS

This application claims the benefit of priority of U.S. Provisional Application No. 63/356,721 filed Jun. 29, 2022, which is incorporated herein by reference.

BACKGROUND OF THE INVENTION

(1) Field of the Invention

The invention pertains generally to systems for validating personal identification (ID) documents. More specifically, the invention relates to collecting images and metadata of fake identification (ID) documents in a database and providing access thereto by other entities for a variety of applications.

(2) Description of the Related Art

Confirming a person's identity often involves authentication of personal identification documents (ID) such as driver's license, passport or other government-issued ID. There are myriad situations where identification documents may need to be validated. Some examples include when a person opens a bank account or applies for financing, makes certain types of purchases such as weapons or other restricted items, enters certain venues or locations such as nightclubs and bars, rides on certain types of transportation such as public airlines, applies for various government support payments, enrols in post-secondary education, takes certain types of examinations, starts working at a new job, etc.

Fake ID documents present an ever-growing problem. High-quality fake driver's licenses or similar fake ID documents can be ordered online and delivered via mail. Typically these IDs are printed by sophisticated printers based in foreign jurisdictions where the counterfeiter is not exposed to any legal liability. It is very difficult for an untrained individual such as a typical staff member at a licensed entertainment venue to spot these fakes. For this reason, electronic and computerized solutions are desired.

Due to the variety of applications where ID documents need to be validated, there are many organizations working on different technical solutions to the problem of detecting fake IDs in different industries. For instance, bars and nightclubs care about preventing underage patrons entry to their venues while banks care about avoiding fraud and preventing identify theft. The needs for ID validation in these two different industries vary great. Bars and nightclubs place great importance on the speed of processing patrons lined up outside for entry whereas banks have much more time to validate each customer during 1-on-1 meetings. Different vendors servicing these two industries therefore provide greatly different products for automatically detecting or assisting with detecting fake IDs.

Different organizations providing document authentication systems and services in different industries are generally isolated from one another and do not cooperate on their efforts. One reason they do not cooperate with each other is they may not even know of the other's existence due to the greatly different industries. Even to the extent that they know of the other's existence, they may consider the other as an actual or potential competitor and be wary of negotiating ongoing cooperation. However, despite the reasons for failing to cooperate with each other, the fact remains that fake IDs are a dynamic and continuing problem that affects many different industries. If the different legitimate organizations combating the problem of fake IDs could easily share certain information with each other regardless of industry and regardless of competition concerns, this would greatly improve the detection of fakes by all organizations and likewise improve document authentication across all industries.

BRIEF SUMMARY OF THE INVENTION

According to an exemplary embodiment of the invention there is disclosed a system for collecting fake identification documents that includes a central controller coupled to scanners and external systems. The scanners scan identification documents and report images of fake or suspected fake identification documents to the central controller. Documents may be automatically detected as fake by matching against known fake ID templates or by detecting that information extracted from the document appears manufactured or incorrect. Documents may also be manually flagged as suspicious by scanner operators either on-the-fly during routine scanning or in batch operations. Scanned documents may further be sent from scanner to central controller during audit events. The central controller enables human review if desired, and, when reported documents are confirmed to be fake, images of the fake IDs along with metadata thereof are added to a fake ID database. The external systems are then notified and may retrieve fake ID templates from the database for a variety of applications.

According to an exemplary embodiment of the invention external systems may utilize fake ID templates retrieved from the database to train machine learning algorithms such as neural networks to detect fake IDs. The training may result in updated identification document authentication algorithms both on external systems and on the central controller. The algorithms on the external systems may be different than those developed at the central controller and both the central controller vendor and the external system vendor may update software of a plurality of scanners that they operate according to their own independent algorithms. In this way, the detecting of fake IDs improves over time as more and more fake ID templates are added to the database.

According to an exemplary embodiment of the invention there is disclosed another application of the database being a user interface for reviewing scans against known fake ID templates. An agent scans an ID during an identity proofing process, and the agent reviewing the scanned ID is provided with fake ID templates and examples corresponding to the ID template that was matched, along with metadata, to visually discern whether an ID is fake or not. Essentially this is a programmatic reference book for every ID scan to aid in visual identification of fake IDs. Authorization zones are highlighted with the option to view more fake samples of the ID or specific authorization zones.

According to an exemplary embodiment of the invention there is disclosed a system for collecting information of fake identification documents and providing access thereto by a plurality of external systems. The system includes a central controller having one or more processors coupled to one or more storage devices and one or more communication interfaces. The one or more communication interfaces of the central controller are further coupled to the plurality of external systems and to a plurality of scanners via one or more computer networks. At least some of the scanners are located at different venues where identification documents of users of the different venues are being scanned. By executing a plurality of software instructions loaded from the one or more storage devices, the one or more processors of the central controller are configured to receive a respective image data and metadata for each of a plurality of different identification documents scanned by the plurality of scanners via the one or more computer networks. The one or more processors of the central controller are further configured to determine whether each of the different identification documents is a fake, and, when determining that a particular one of the different identification documents is a fake, add the respective image data and metadata for the particular one of the different identification documents as a fake ID template to a database stored in the one or more storage devices. In this way, over time, the database accumulates a plurality of fake ID templates as more and more of the different identification documents scanned by the scanners are confirmed fake. The one or more processors of the central controller are further configured to provide access to the database by the plurality of external system over the one or more computer networks such that each of the plurality of external systems is able to retrieve the plurality of fake ID templates from the database.

According to an exemplary embodiment of the invention there is disclosed a central controller in a system for collecting information of fake identification documents and providing access thereto by a plurality of external systems. The central controller includes one or more communication interfaces, one or more storage devices, and one or more processors coupled to the one or more storage devices and the one or more communication interfaces. The one or more communication interfaces are further coupled to the plurality of external systems and to a plurality of scanners via one or more computer networks. At least some of the scanners are located at different venues where identification documents of users of the different venues are being scanned. By executing a plurality of software instructions loaded from the one or more storage devices, the one or more processors are configured to receive a respective image data and metadata for each of a plurality of different identification documents scanned by the plurality of scanners via the one or more computer networks. The one or more processors are further configured to determine whether each of the different identification documents is a fake, and, when determining that a particular one of the different identification documents is a fake, add the respective image data and metadata for the particular one of the different identification documents as a fake ID template to a database stored in the one or more storage devices. In this way, over time, the database accumulates a plurality of fake ID templates as more and more of the different identification documents scanned by the scanners are confirmed fake. The one or more processors are further configured to provide access to the database by the plurality of external system over the one or more computer networks such that each of the plurality of external systems is able to retrieve the plurality of fake ID templates from the database.

According to an exemplary embodiment of the invention there is disclosed a method of collecting information of fake identification documents and providing access thereto by a plurality of external systems. The method includes receiving, by a central controller, a respective image data and metadata for each of a plurality of different identification documents scanned by a plurality of scanners via one or more computer networks, wherein at least some of the scanners are located at different venues where identification documents of users of the different venues are being scanned. The method further includes determining whether each of the different identification documents is a fake, and, when determining that a particular one of the different identification documents is a fake, adding, by the central controller, the respective image data and metadata for the particular one of the different identification documents as a fake ID template to a database stored in one or more storage devices. In this way, over time, the database accumulates a plurality of fake ID templates as more and more of the different identification documents scanned by the scanners are confirmed fake. The method further includes providing access to the database by the plurality of external system over the one or more computer networks such that each of the plurality of external systems is able to retrieve the plurality of fake ID templates from the database.

These and other advantages and embodiments of the present invention will no doubt become apparent to those of ordinary skill in the art after reading the following detailed description of preferred embodiments illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
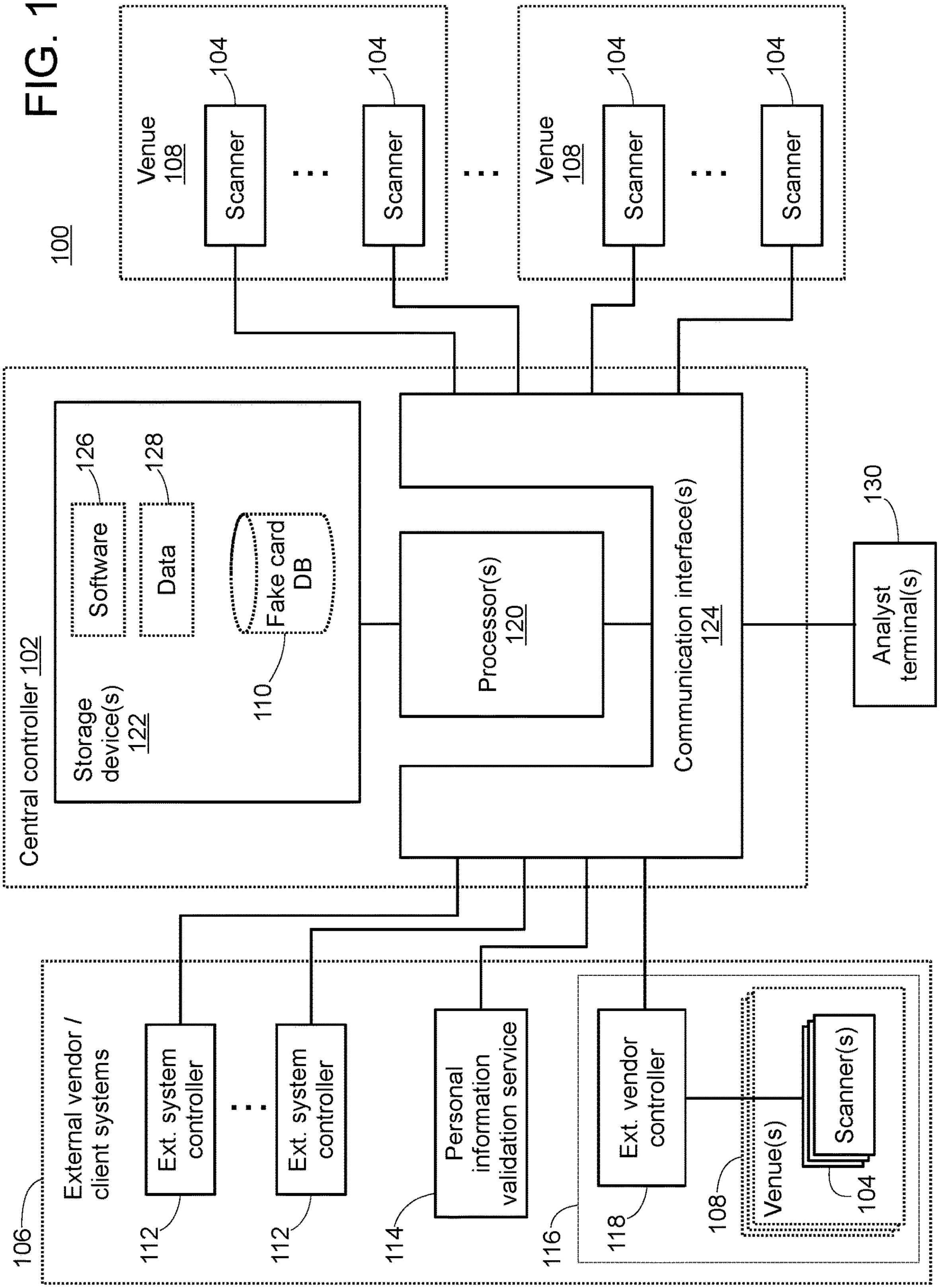
FIG. 1 illustrates a block diagram of a system for collecting images and metadata of fake identification (ID) documents and providing access thereto by other entities for a variety of applications according to an exemplary embodiment.

FIG. 1 illustrates a block diagram of a system 100 for collecting images and metadata of fake identification (ID) documents and providing access thereto by other entities for a variety of applications according to an exemplary embodiment.

Although competition between organizations and independent development of different approaches to combating fakes IDs are generally beneficial to improving the state of the art, one common requirement that all organizations working on this problem have is the need for examples of confirmed fake ID documents. Large datasets of fake ID documents are desirable for both training neural networks (i.e., machine learning) to spot fakes and also for the development of programmatic algorithms for automatically detecting and helping humans to spot fake documents. The system 100 of FIG. 1 can be beneficially utilized by any organization that collects fake IDs to provide access by other entities to said collection along with supporting metadata. Quality of document authentication can thereby by improved across different industries while the organization making their collection available to others may be monetarily rewarded by receiving payments from the entities gaining access.

The system 100 of FIG. 1 includes a central controller 102 coupled to a plurality of document scanners 104 and further coupled to one or more external vendor and/or client systems 106. The scanners 104 are located at different venues 108, where each separate venue 108 location has one or more scanners 104.

In some embodiments, the scanners 104 may be as described in United States Patent Application Publication No. 20210004581, published on Jan. 7, 2021 and entitled, "APPARATUS, SYSTEM AND METHOD FOR AUTHENTICATING IDENTIFICATION DOCUMENTS", which is incorporated herein by reference, and the scanners 104 may be placed at the doors of venues 108 being licensed entertainment establishments such as bars, nightclubs, clubs, etc. Door staff at the venues 108 use the scanners 104 to check ID of patrons seeking to gain entry to the venue 108. The scanners 104 leverage continuously updated valid and fake ID templates stored in a central database 110 to provide automated results informing the door staff of whether IDs are valid or fake. In some embodiments, this portion of the operation of the central controller 102 and the scanners 104 may be as described above in the U.S. 20210004581 patent publication and is therefore omitted herein for brevity.

The external vendor and client systems 106 may include any number of external system controllers 112 coupled to the central controller 102, for example, via the Internet or other computer networks. A couple of specific examples of external vendor/client systems 112 connected to the central controller 102 are shown in FIG. 1 being a personal information validation service 114 and an external scanner network vendor service 116. The external scanner network vendor service 116 includes an external vendor controller 118 (which may be similar in structure to the central controller 102 shown in FIG. 1) and which may itself be coupled to one or more scanners 104 that may be located at one or more respective venues 108. In some applications, the vendor that operates the central controller 102 shown in FIG. 1 may be a direct competitor to the vendor that operates the external vendor controller 118; in other applications, the vendor that operates the central controller 102 shown in FIG. 1 may be serving a completely different industry and have no knowledge of the vendor that operates the external vendor controller 118. Although only one external vendor controller 118 and associated external network of scanners 104 is shown in FIG. 1, this is for simplicity of illustration and there may be any number of similar external vendor controllers 118 coupled to the central controller 102.

Other examples of external vendor systems 106 that may be coupled to the central controller 102 include other companies such as online shopping websites, bank and other financial systems, customer registration centers, and other entities that validate personal identification information of users and/or assist with the process of validating personal identification information of users.

The central controller 102 in this embodiment is a computer server including one or more processors 120 coupled to one or more storage devices 122 and one or more communication interfaces 124. The one or more processors 120 may be included in a central processor unit (CPU) of a computer server acting as the central controller 102. In the following description the plural form of the word "processors" will be utilized as it is common for a CPU of a computer server to have multiple processors 120 (sometimes also referred to as cores); however, it is to be understood that a single processor 120 may also be configured to perform the described functionality in other implementations. The communications interfaces 124 include devices such as wired and wireless transceivers enabling the central controller 102 to communicate with the various devices coupled thereto. For instance, an Ethernet port may be one of the communications interfaces 124 and couple the central computer 102 to a computer network such as the Internet.

The storage devices 122 in this embodiment include both long-term (non-volatile) storage such as magnetic hard drives and FLASH memory and short-term (volatile) storage such as dynamic random access memory (DRAM), for example. Stored within the storage devices 122 are software 126 and data 128. The processors 120 execute the software 126 loaded from the storage device 122 in order to use and create the data 128 as described herein. Certain elements of the data 128, in particular respective images of fake ID documents and associated metadata are stored in a database 110 and access to this database 110 is provided to other one or more external vendor/client systems 106 such as the external vendor controller 118. Further details about how the images/metadata in the database 110 are collected and what data in the database 110 is shared is described further below.

As illustrated in FIG. 1, one or more analyst terminal(s) 130 are also coupled to the central controller 102. The analyst terminals 130 are computers such as desktops and/or laptop computers allowing human analysts to remotely interact with the central controller 102.

Figure 2:
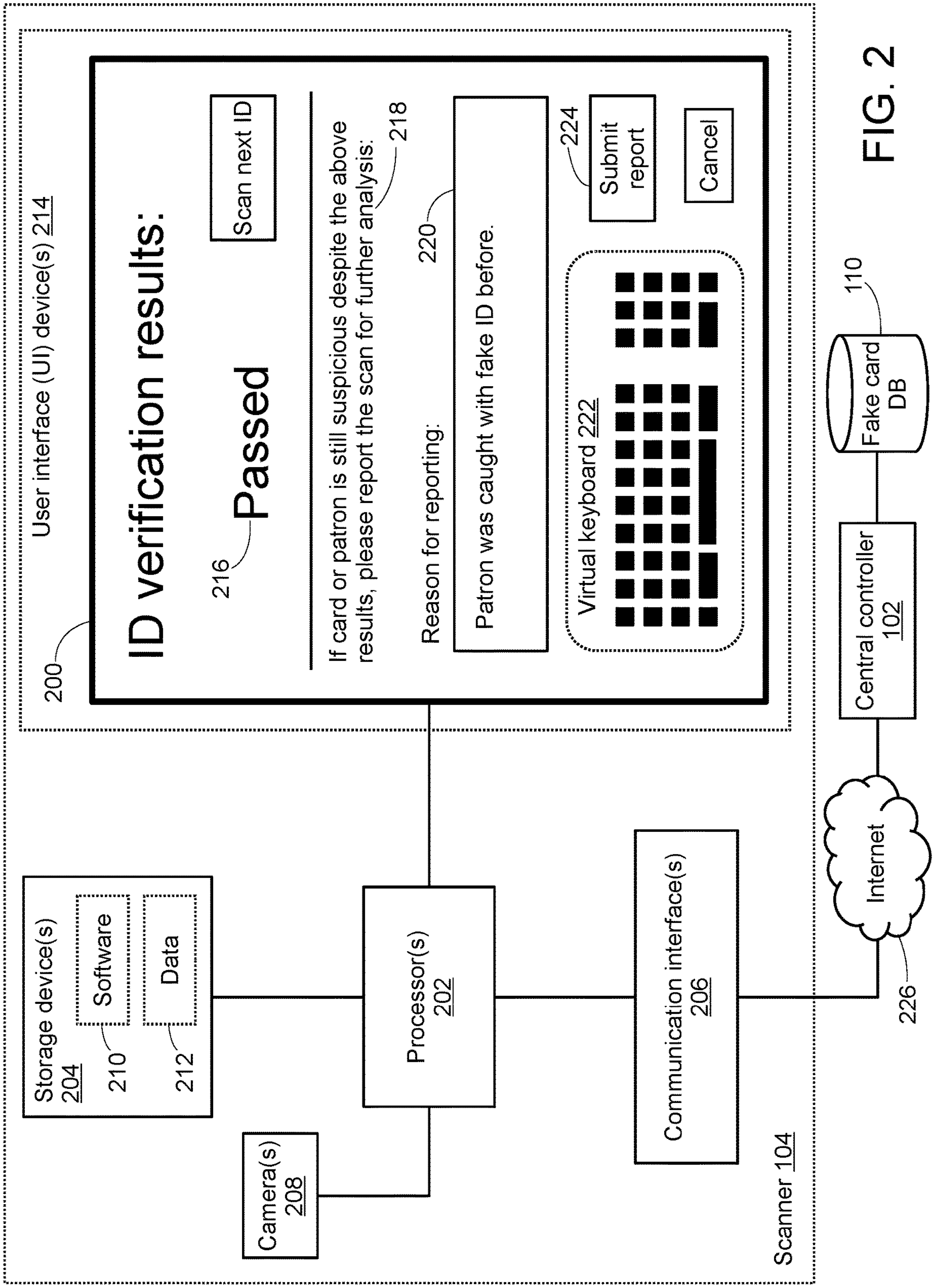
FIG. 2 illustrates a block diagram of some hardware elements of one of the scanners along with a user interface (UI) screen displayed by the scanner allowing a door person to flag IDs as fake or suspected fake and optionally enter reasons according to an exemplary embodiment.

FIG. 2 illustrates a block diagram of some hardware elements of one of the scanners 104 along with a user interface (UI) screen 200 displayed by the scanner 104 allowing a door person to flag IDs as fake or suspected fake and optionally enter reasons according to an exemplary embodiment. Each scanner 104 in this embodiment is an embedded computing device including one or more processors 202 coupled to one or more storage devices 204 and one or more communication interfaces 206. The one or more processors 202 may be included in a central processor unit (CPU) of a computing device acting as the scanner 104. In the following description the plural form of the word "processors" will be utilized as it is common for a CPU of an embedded computing device to have multiple processors 202 (sometimes also referred to as cores); however, it is to be understood that a single processor 202 may also be configured to perform the described functionality in other implementations.

Similar to the central controller 102 shown in FIG. 1, the storage devices 204 may include volatile and non-volatile computer memory devices such as RAM, FLASH, magnetic hard drives, etc.; and the communication interfaces 206 may include any combination of wired and wireless transceivers such as Wi-Fi transceiver chips, Ethernet chips, etc. Each scanner 104 also includes one or more cameras 208 (which may also be implemented as optical scanning devices) for capturing images of identification documents placed within the scanner 104. Again, hardware elements of the scanners 104 are well-known such as described in U.S. 20210004581 publication and further details are therefore omitted herein for brevity.

The storage device 204 includes software 210 and data 212 for allowing the processors 202 to operate in order to generate various UI screens such as UI screen 200 on a UI display device 214 such a touchscreen. In particular, the processors 202 execute the software instructions 210 loaded from the storage devices 204 in order to the generate a UI screen 200 that shows the authentication results for a particular ID card. When a card is deemed by the scanner 104 to have passed authentication, a result 216 such as "Passed" is displayed on the touchscreen 214; however, in this embodiment, the processors 202 also display instructions 218 to the operator that "If the card or patron is still suspicious despite the above results, please report the scan for further analysis." A text input box 220 and virtual keyboard 222 are provided onscreen allowing the operator to input reasons for the reporting the ID for further analysis. A "submit report" button 224 will cause the processors 202 to send data 212 corresponding to the captured images of the ID card to which the report pertains to the central server 102, for instance, via the communication interfaces 206 sending the data 212 over the Internet 226. Likewise, metadata such as the reasons for reporting the card as suspicious as inputted by the operator in text box 220 are included in the data 212 sent to the central controller 102.

The UI screen 200 illustrated in FIG. 2 allows easy real-time reporting of suspicious or suspected fake ID cards by door persons and other scanner 104 operators. Beneficially in this embodiment, the UI screen 200 allows the operator to "on the fly" report ID cards to the central server 102. The reporting of a card in this embodiment does not change the ID verification results 216 and does not require the operator of the scanner 104 to inform the ID card holder or otherwise deny them entry to the venue 108. It simply sends back card scans and associated metadata to facilitate analysts of the central server 102 to manually analyze the card image(s) at a later time. It is possible that the scanner's 104 automatic authentication algorithm may miss some fake cards (i.e., falsely report them as having passed authentication) even when the human scanner operator may feel that is something suspect about them or may even in some cases have an admission from the card holder or other information that the card is fake. In these cases, rather than requiring the scanner operator to confiscate the fake ID or otherwise remember details about them or save the scan record manually, a simple UI input box 220 and reporting button 224 are available to allow easy reporting of the card images to the central controller 102.

The software 210 stored in the storage devices 204 may also have instructions for causing the processors 202 to generate other UI screen(s) that allow reporting of suspected or known fake ID cards to the central server 102 in batch. For instance, some entertainment venues 108 such as bars and clubs may have bags of fake IDs that have been confiscated over the years and may wish simply report all those cards through the scanner 104 to the central controller 102 to better improve the fake card detection algorithms and software 210. A UI screen for batch fake and suspected fake ID cards may be provided that simply prompts the scanner operator to insert cards one after another where each image scan is automatically reported to the central controller 102 for further analysis and metadata is associated with all said images that the cards are suspected or known fake. Optional reasons such as in a text box 220 may be entered for each and these reasons (if entered) are also included in the metadata reported to the central controller 102.

In yet another embodiment, the scanner 104 may include an audit mode, which when enabled will automatically report all or some predetermined percentage of scans in routine operation to the central server 102. For instance, an audit mode may be enabled one a week for 24 hours such that images and metadata of all ID cards scanned during that 24 hour period are sent back to the central controller 104. Human analysts operating analyst terminals 130 may then manually double check those ID cards in order to validate the authentication software 210 and make improvements thereto.

Figure 3:
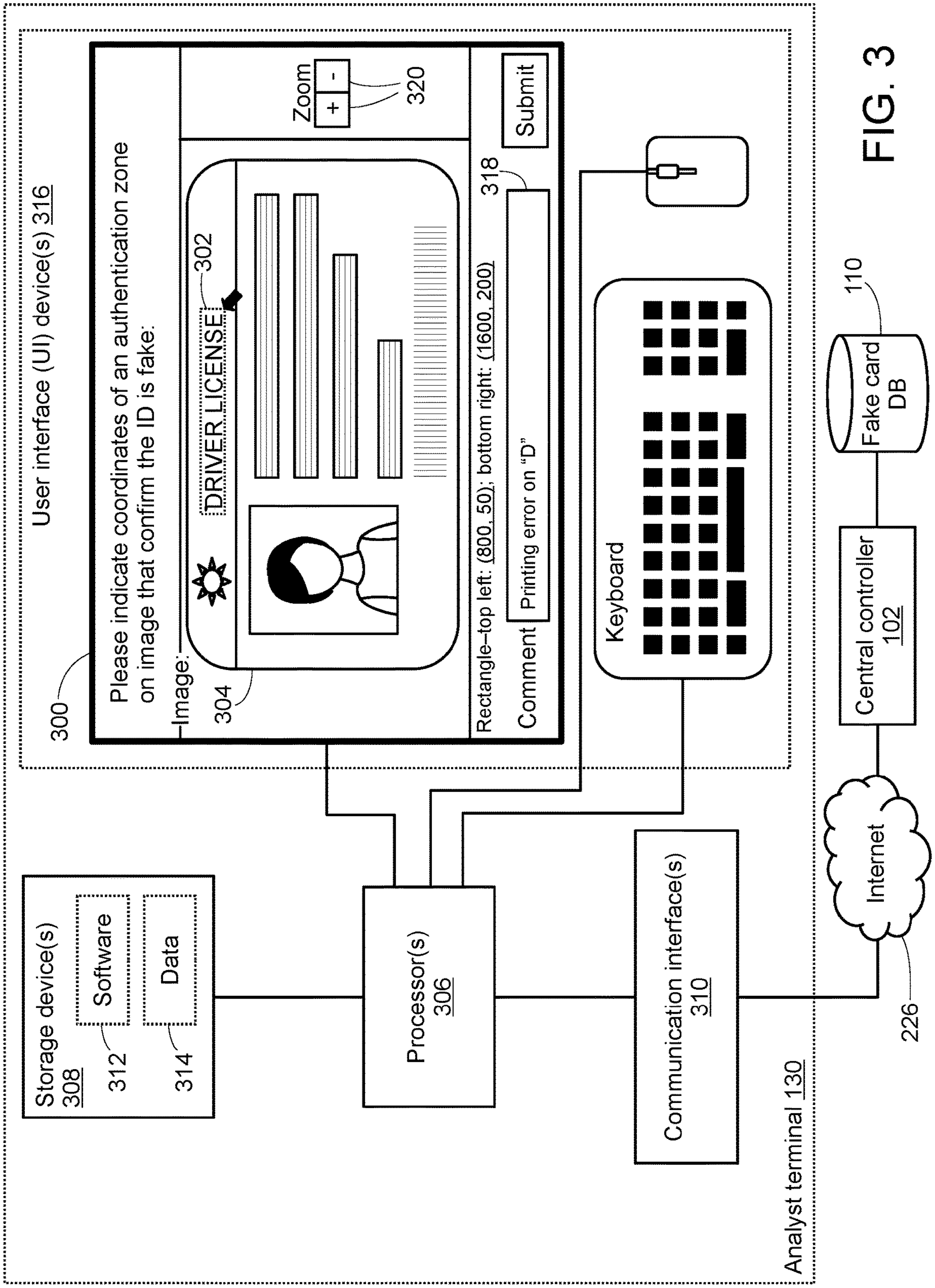
FIG. 3 illustrates a block diagram of some hardware elements of an analyst terminal with a user interface (UI) screen displayed by the analyst terminal allowing the analyst to manually draw coordinates of an authentication zone where an ID scan image may be checked as being fake according to an exemplary embodiment.

FIG. 3 illustrates a block diagram of some hardware elements of an analyst terminal 130 with a user interface (UI) screen 300 displayed by the analyst terminal 130 allowing the human analyst to manually draw coordinates of an authentication zone 302 where an ID scan image 304 may be checked as being fake.

The analyst terminal 130 in this embodiment is desktop or laptop computer including one or more processors 306 coupled to one or more storage devices 308 and one or more communication interfaces 310. The one or more processors 306 may be included in a central processor unit (CPU) of a computer acting as the analyst terminal 130. In the following description the plural form of the word "processors" will be utilized as it is common for a CPU of a desktop or laptop computer to have multiple processors 306 (sometimes also referred to as cores); however, it is to be understood that a single processor 306 may also be configured to perform the described functionality in other implementations.

Similar to the central controller 102 shown in FIG. 1 and the scanner 104 shown in FIG. 2, the storage devices 308 may include volatile and non-volatile computer memory devices such as RAM, FLASH, magnetic hard drives, etc.; and the communication interfaces 310 may include any combination of wired and wireless transceivers such as Wi-Fi transceiver chips, Ethernet chips, etc. The storage devices 308 include software 312 and data 314 for allowing the processors 306 to operate in order to generate various UI screens on a display device 316 such as a screen 300. In particular, the processors 306 execute the software instructions 312 loaded from the storage devices 308 in order to the generate a UI screen 300 that shows an image 304 of a scan of an ID card and allows the analyst doing a review to draw a box around an area of the card to designate as an authentication zone 302.

As an example, the analyst has drawn a box representing an authentication zone 302 around the card title of "DRIVER LICENSE" in this example as the analyst has determined there are one or more pixels or other elements of that area of the card that are not correct. The authentication zone 302 designated in this screen may be used by card authentication vendors as an example of a fake ID card in order to improve automatic authentication algorithms. The coordinates of the authentication zone 302 in this embodiment include a top left pair of x, y pixel positions and a bottom right pair of x, y pixel positions. Together together, these pairs of coordinates form a rectangular box that will surround the card title of DRIVER LICENSE and can be used to extract and isolate similar areas from all image scans of matching cards of the same type/year. For example, all California driver's licenses printed in the year 2022 will have a similar design and thus the authentication zone 302 drawn may need to be analyzed on all 2022 California driver's licenses.

In addition to drawing a box around the desired authentication zone 302, the UI screen 300 of FIG. 3 also includes a text input box 318 that allows the analyst to enter one more comments, which are stored as additional metadata associated with the card in general and the authentication zone 302 in particular that can help other people understand what about the authentication zone 302 is improper on fakes. For instance, in this example, the analyst has determined there is a printing error on the letter D. Zoom buttons 320 are provided on the UI screen 300 to assist the analyst to zoom in and out as required to inspect details both small and large and to adjust the box as drawn to properly define the authentication zone 302. When ready, the submit button 322 can be used to send the coordinates and comment box details to the central controller 102 for saving in the database 110.

In addition to defining authentication zones 302 as rectangular areas, the UI screen 300 of FIG. 3 may also allow other polygons and shapes including curved lines to be drawn in some embodiments. For example, an authentication zone 302 may be a circle or an oval around a logo or may be defined as an x-sided shape drawn by the analyst.

Further, although only one authentication zone 302 is shown for a particular ID card scan image 304 in FIG. 3, in some embodiments, a single card scan image 304 may have many different authentication zones 302 drawn thereon by the analyst and each may have different coordinates and reasons as desired inputted. For instance, a single fake ID card may have many different errors and differences with a valid card and the analyst may group them into several authentication zones 302 such as one for the card title, one for the barcode, one for the jurisdiction logo, etc.

Figure 4:
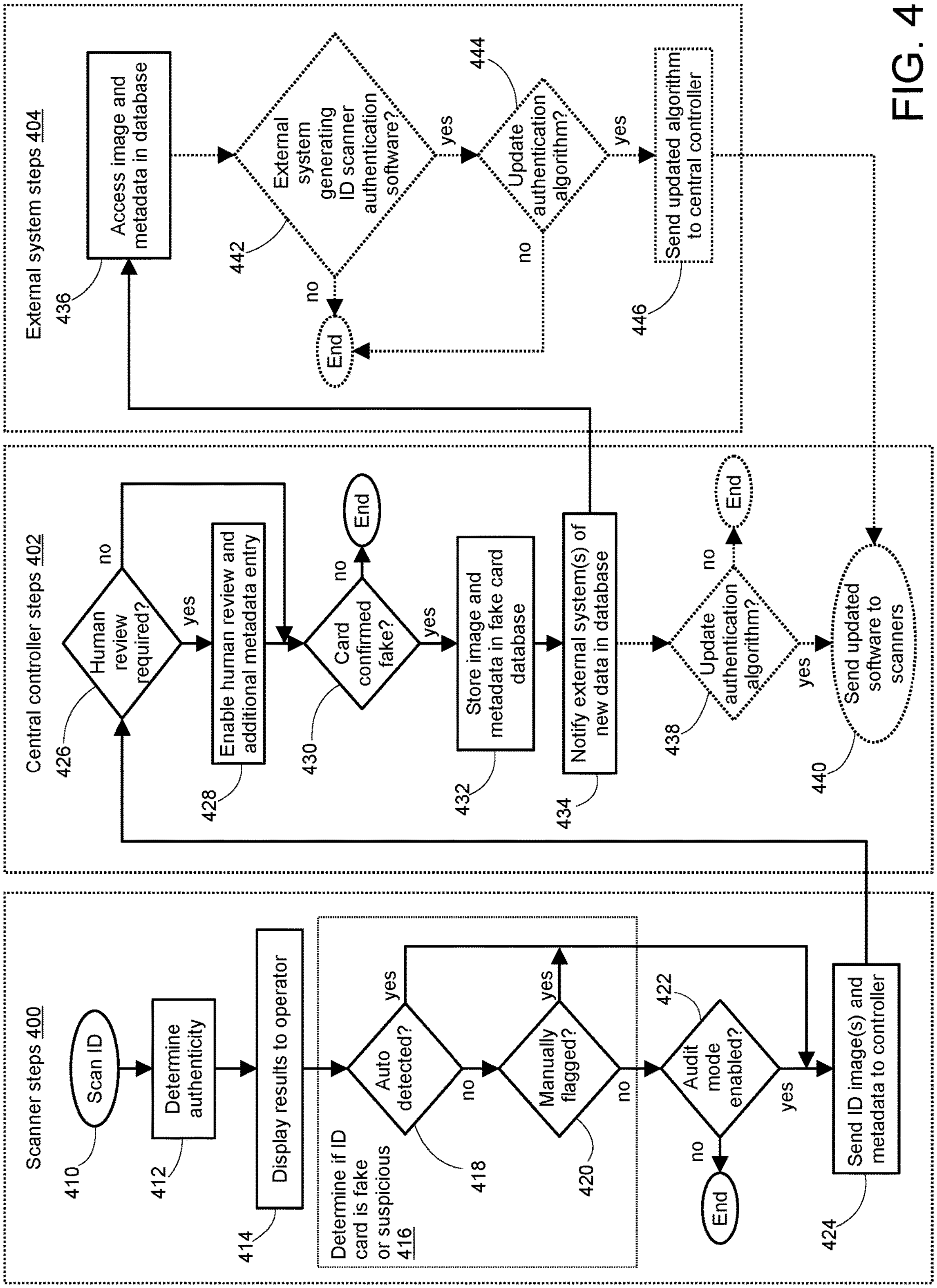
FIG. 4 illustrates a flowchart of operational steps of the system of FIG. 1 for collecting images and metadata of fake and suspected fake identification documents in the database and providing access thereto by other entities according to an exemplary embodiment.

FIG. 4 illustrates a flowchart of operational steps of the system 100 of FIG. 1 for collecting images and metadata of fake and suspected fake identification documents in the database 110 and providing access thereto by other entities 116 according to an exemplary embodiment. The steps of FIG. 4 are performed by the scanner 104, the central controller 102 and the external system 118, respectfully. In particular, a first group of steps 400 are performed by the one or more processors 202 of the scanner 104, a second group of steps 402 are performed by the one or more processors 120 of the central controller 102, and a third group of steps 404 are performed by one or more processors of the external system controller 112. The steps of the flowchart are not restricted to the exact order shown, and, in other configurations, shown steps may be omitted, other intermediate steps added, and steps as illustrated may be performed by other devices than as labelled in FIG. 4.

The process in this embodiment begins at step 410 when a scanner 104 scans an ID card and generates image data for processing by the one or more processors 202 of the scanner. At step 412, the processors 202 of the scanner 104 determine the authenticity of the ID card that was scanned by analyzing the image data 212 collected at step 410, and at step 414 the results 216 of the authentication process are displayed by the processors 202 on the scanner's touchscreen 214 to the operator—i.e., see FIG. 2, for example.

In some embodiments, steps 410, 412, and 414 corresponds to routine operation of the scanner 104 to check patron IDs such as outside a nightclub or bar or other venue 108. These functions and the associated software algorithms are already known in the art such as described in the U.S. 20210004581 patent publication and may be implemented herein in a similar manner. Additionally, as described above, one or more further UI screens 200 such as that illustrated in FIG. 2 may be incorporated in the scanner 104 at step 414 allowing an operator of the scanner 104 to report cards as fake or suspected fake despite the scanner's automated authentication algorithm at step 412 determining the card to be valid. Likewise, one or more UI screens or other software configuration settings may be available for the scanner operator to initiate an audit mode, which would cause all or a predetermined number or frequency of cards to be reported to the central controller 102.

At step 416, the processors 202 of the scanner 104 determine whether the ID card is fake or suspicious according to both the automatically determined check perform at step 412 and also any manual input received from the operator at step 414. In particular, at step 418, the processors 202 determine whether the automatic authenticity check performed at step 412 determined the card to be a fake. When yes, control proceeds to step 424; otherwise, control proceeds to step 420.

In some embodiments, address and name verification can be done in real time as well as a part of the authentication process at step 412. For instance, the one or more processors 202 of the scanner 104 may be configured to detect name and address information on the ID card such as by scanning bar codes and extracting the name/address information encoded therein, or by performing an optical character recognition (OCR) process on text data printed on the card. Once detected, the one or more processors 202 query the personal information validation service 114 over the Internet 226 in order to obtain a confidence score of how likely the name and/or address correspond to a real person. The personal information validation service 114 may query one or more additional databases and also perform automated search engine searches and check social media etc. to determine if the name and/or address appear real. A resulting confidence score of how likely the identify is fake (i.e., manufactured by the user) may then be provided to the central controller 102. This feedback may happen in real time after the card is scanned by the scanner 104. Depending on whether or not the identify is likely fake or manufactured, the scanner 104 processors 202 may then automatically determine the ID card to be a fake or suspected as fake at step 418. In this way, ID cards that have what appear to be a fake or manufactured identifies (even if there are no printing errors detected with the card) are also automatically flagged by the scanner 104 as suspicious at step 418.

At step 420, the processors 202 determine whether the scanner operator has submitted a report that the ID card is suspicious or known to be fake despite the scanner's algorithm at step 412 determining the card to be valid. For instance, when the operator enters one or more reasons in text box 220 for reporting and clicks the "Submit Report" button 224 illustrated in FIG. 2, the results of step 420 will be "yes" and control will proceed to step 424; otherwise, when the operator has not initiated a manual reporting of the card as being fake or suspected fake, control proceeds to step 422.

At step 422, the processors 202 determine whether an audit mode is activated on the scanner 104 that would cause the scanned card's image and metadata to be sent to the central controller 102 despite neither the automatic detection process by the scanner processors 202 at step 412 and the manual operator input at step 414 indicating that the ID card is fake or suspected as being fake. When the audit mode is enabled, control proceeds to step 424; otherwise, the process ends without further reporting. Once ended, the process may restart again when a next ID card is inserted into the scanner 104 such as for checking a next patron's documents.

At step 424, the processors 202 of the scanner 104 send the ID card image(s) along with associated metadata to the central controller 102 for further analysis. The image data may include separate images files for both the front and back of the card assuming both were scanned. The metadata may include any reasons entered in the text box 220 of FIG. 2 when an operator of the scanner 104 submits a report that the ID card may be fake. Other metadata may include an identifier of the scanner 104 or venue 108 at which the scanner 104 is located along with date and time information. For instance, the information sent by the processors 202 at step 424 may be encrypted for security and then packaged into one or more packets and sent over the Internet 226 or other computer network to the central controller 102.

At step 426, the processors 120 of the central controller 102 receive the information sent by the scanner 104 and determine whether a human review is required before adding said information to the database 110. In some embodiments, all fake and/or suspected fake ID cards are first analyzed by a human analyst to confirm before being added to the database 110 so the result of step 426 may always be "yes" in some embodiments (or step 426 may simply be omitted and control may proceed from step 424 to step 428). Alternatively, in some embodiments, only some card image scans may be reviewed by human analysts according to one or more configuration settings on the central controller 102 and/or according to characteristics of the card such as date and time scanned and type of card. When human review is required, control proceeds to step 428; otherwise, control proceeds to step 430.

At step 428, the processors 120 of the central controller 102 enable human review and facilitate additional metadata entry by the human analyst doing the review. For instance, the central controller 102 may send image file(s) of the card to be reviewed to an analyst terminal 130 to display the UI screen 300 of FIG. 3 and allow an operator to enter authentication zone information 302. In some embodiments, the UI screen 300 of FIG. 3 may be generated by a custom software program 312 running on the analyst terminal 130 and this custom software program 312 may cause the processors 306 of the analyst terminal 130 to communicate with the central controller 102 to receive card image data. Alternatively, in some embodiments, the UI screen 300 of FIG. 3 may be generated by a general purpose web browser program running on the analyst terminal 130 and the web browser may receive webpage information from a webserver running on the central controller 102.

In general, the processors 120 of the central controller 102 communicate with the analyst terminal 130 at step 428 to thereby enable the analyst terminal 130 to generate and display a UI screen 300 such as that shown in FIG. 3 so that a human analyst can analyze the card images, determine whether fake characteristics are present and where on the images said fake characteristics are located, and define one or more authentication zones 320 being areas of the card which should be checked on similar types of cards to look for the same characteristics. At step 428, the processors 120 of the central controller 102 also receive information back from the analyst terminal 130 about whether the card is confirmed by the analyst to be fake and if yes coordinates and other metadata about one or more of the authentication zones 302 identified by the analyst.

At step 430, the processors 120 of the central controller 102 determine whether or not the card is confirmed to be a fake. For instance, this may be determined according to an answer received from the analyst terminal. Alternatively, in situations where human review is not performed (i.e., the "no" branch of step 426), the determination may be made automatically by the processors 120 of the central controller 102 analyzing the image data according to any desired algorithm such as an updated version of the algorithm originally performed by the scanner at step 412. (As explained in further detail below with regards to the steps indicated with dotted lines in FIG. 4, the updated algorithm may take into account one more previous confirmed fake ID cards that were not available when the card was originally scanned and hence the original algorithm in the scanner at step 412 did not take into account.) When the card is confirmed to be fake, control proceeds to step 432 to store the card image(s) into the database 110; otherwise, when the card is determined to not be fake, the process ends without storing the card image(s) as fake in the database 110.

At step 432, the processors 120 of the central controller 102 store the image(s) of the card now confirmed to be fake along with metadata of the card into the fake card database 110 for other entities 106 to access. In this embodiment, a relational database is utilized to store the fake card database 110; however, the term "database" 110 as utilized in this description is meant to refer to any stored collection of organized data.

The fake card database 110 includes a collection of ID images captured using the various scanners 102 that have been deemed counterfeit by either human ID analysts and/or automatic fake ID detection algorithms.

The images contained in the database 110 are captures of the front and optionally back of the counterfeit (i.e., fake) card. The images stored in the database are produced by scanning the front and/or back of an ID card with a document scanner 104, or camera, and, in some cases, applying minimal post-processing to retain the integrity and standardization of the document library. Examples of the post-processing techniques applied depend on the scanner hardware used to capture the image and include but are not limited to image scaling, minor brightness and contrast adjustments, and grey scaling.

Each of these images contain metadata describing the ID captures and the mechanism(s) used to ascertain the capture as counterfeit. Specifically, the following metadata may be associated with the images:

- the ID template type (e.g., New York State, 2021);
- the city in which the counterfeit was identified;
- the type of venue in which the counterfeit was identified;
- the source of determining the card is a counterfeit (submitted by the operator, caught automatically by software, identified by an analyst during a review, etc.);
- the date and time the counterfeit was identified;
- the coordinates of the ID authorization zone(s) that were determined counterfeit; and
- the coordinates of the ID flaw deeming the ID as counterfeit.

At step 434, the processors 120 of the central controller 102 notify one or more of the external vendor and client systems 106 of the new data in the database 110. At step 436, an external system controller 112 accesses the fake ID card image(s) and associated metadata in the database 110.

In some embodiments, a combination of images of a fake ID along with associated metadata is referred to as a fake ID template. The fake ID templates may be notified to the external systems 106 at step 434 and provided by the central controller 102 to the external systems 106 at step 436 in different ways such as:

- Using a webhook—The external client initially downloads the complete database 110 and is thereafter notified of updates (newly added fake ID templates)

immediately so they may fetch new ones from the database 110 over the computer network as they are added Sync service—The external client initially downloads the complete database 110 and thereafter fetches the differences on set intervals (every day, every hour etc.)

Application programming interface (API) request—The client would not download the whole database in this case but instead retrieve templates in accordance with what is requested. (e.g., the central controller 102 may provide all fake templates for a California 2022 ID in response to receiving a request for this type of ID card template.) The processors 120 of the central controller 102 may also provide full images of the templates or specific 'authorization zones' 320 upon request via the API.

The central controller 102 may support all of the above mentioned ways and different ones of the external systems 106 may utilize different ones according to their requirements. For example, the external systems 106 may utilize the fake card data to train neural network and/or other machine learning algorithms to detect fake ID cards using the confirmed fake ID templates as training data. Or the external systems 106 may utilize the fake ID templates to assist human customer support and other users to verify ID documents. The applications for which the fake ID templates stored in the database may be used are unlimited—in general, the fake ID templates stored in the fake ID database 110 may be shared by the vendor that runs the central control 102 to any number of external vendors and clients 106. The external vendors and clients 106 may monetarily compensate the vendor that runs the central controller 102 in order to gain access. Alternatively or in addition, in some applications, the external vendor systems 106 may also provide fake ID templates into the database 110 and/or assist with updating the fake ID detection algorithms, which may be provided back to the vendor that runs the central database 102 as another form of compensation. It is also possible that each of a plurality of separate vendors run their own system 100 as illustrated in FIG. 1 such that each maintains its own fake ID database 110 and allows other external system 106 entities to gain access to fake ID temples stored therein as desired.

The flowchart of FIG. 4 illustrates a number of additional optional steps that are shown in dotted lines—these steps represent steps related to dynamically updating the fake ID detection algorithms in view of the new fake ID templates stored in the fake ID database 110. In particular, both the central controller 102, the scanners 104, and/or one or more of the external systems 106 may update the ID authentication algorithms in order to improve fake ID detection.

At step 438, the processors 120 of the central controller 102 determine whether to update the authentication algorithm in view of the new fake ID template stored into the fake ID database 110 at step 432. In some situations, updates of the algorithm may occur during typical scanner 104 downtown periods so that routine scanner 104 operations are not interrupted during peak hours. For instance, if the scanners 104 are installed at night clubs, updates may occur during the daytime hours when the venues 108 are typically closed. Furthermore, not all newly discovered fake IDs may necessitate an algorithm update. Instead, the processors 120 of the central controller 102 may wait until a predetermined number of new fake ID templates are discovered or a predetermined number of new authentication zones 302 are defined before initiating an update. When the central controller 102 determines it is time to update the authentication algorithm, control proceeds to step 438; otherwise, the process may end without update.

At step 440, the processors 120 of the central controller 102 send updated software 210 to the scanners 104 in the field such over the Internet 226. The scanners 102 install the updated software 210 into their various storage devices 204 so that the next time the scanners 104 perform step 412 they will be running the updated authentication algorithm included in the software 210.

Likewise, the external systems 106 themselves may also be running scanners 104 and developing their own ID authentication algorithm. In this case, the answer to step 442 will be "yes" and the external systems 106 may periodically update their scanner ID authentication algorithms based new fake ID templates stored in the fake ID database 110.

At step 442, the external systems 108 may determine whether an update to authentication algorithm is required. This step is similar to step 438 except now it is being performed by a controller 118 or other device of the external system 106. When yes, control may proceed to step 446 in order to send the updated algorithm back to the central controller 102.

At step 446, the external system 106 sends an updated ID authentication algorithm back to the central controller 102, which is thereafter at step 440 deployed to the various scanners 104 coupled to the central controller 102. In this way, the ID authentication algorithm run by the scanners 104 at step 412 may actually be implemented and/or improved by an external system 106 utilizing fake ID templates discovered automatically by the scanners 104 or flagged manually by operators of the scanners 104. The system 100 thereby may be a full feedback system where the scanners 104 in the field get better over time as more fake IDs are detected and stored in the database 110, regardless of the way the fake IDs are originally detected and/or the entity that originally detected the fake IDs.

In some embodiments, there are four processes utilized to collect fake IDs for storage into the database 110. In one, customers and other operators of the scanners 104 determine an ID is fake and submit the fake ID using the "submit fake ID" function on the scanner 104. This may be done by the "submit report" button 224 of FIG. 2 or other UI screens may be utilized to submit batches of collected fake IDs that have previously confiscated or otherwise obtained by the venue 108. After submission, an ID analyst confirms the fake and adds metadata at step 428.

Another way fake ID templates may be added involves customers providing the vendor that runs the central controller 102 with known fake IDs for the vendor to scan and collect into the fake ID template database 110 including metadata. This method is similar to the above-described method except the physical cards are sent such as by mail our courier to the offices of the vendor running the central controller 102. Analysts using the analyst terminal 130 or a similar device may then analyze and add the cards to the fake ID database 110 if appropriate.

Another way fake ID templates are added involves audits of scan history where some or all of the scanned cards are automatically collected by a scanner 104 at step 422 and sent to the central controller 102 in order for analysts to find fake IDs. An ID analyst marks as fake and adds metadata at step 428.

Another way that fake ID templates are added is automatically in response to the authentication algorithms running at step 412 flagging an ID as fake. At step 418, the processors 202 of the scanner 104 then programmatically add metadata to the ID and flags the ID for review. An ID analyst confirms the fake and adds any missing metadata before it is added to the database 110. The next time a fake of this card template type is matched, it gets matched against all known fake ID templates in the database 110 for that type of card for accuracy. This is very close to machine learning, save for the human ID analyst reviewing.

Yet another way that fake IDs may be added to the fake ID database 110 is when an external client 106 independently verifies that an ID is fake and submits fake ID images and any corresponding metadata to the central controller 102. For instance, similar to how various electronic communication methods described above (e.g., webhooks, sync service, APIs) allow for external systems 106 to retrieve fake IDs from the database 110, one or more APIs or other methods may also be provided for external systems 106 to send images to the central controller 102 for analysis. This is very similar to step 424 but is performed by an external system device 106. The rest of the flowchart may proceed as described from step 426. If human review is required, an analyst processes, confirms and adds the fake ID template into the database 110 at steps 428-432. Other external system 106 (i.e., different than the one that provided the new images) are then notified of the update.

As mentioned above, the external clients and vendors 106 may utilize the fake ID templates retrieved from the fake ID database 110 for developing and testing their own fake ID algorithms. The fake ID templates may be used for machine learning training sets and for programmatic algorithm development and testing. However, besides for use in building and designing fake ID detection and valid ID authentication algorithms and processes, the fake ID template database 110 may also be utilized by external entities for other purposes.

Figure 5:
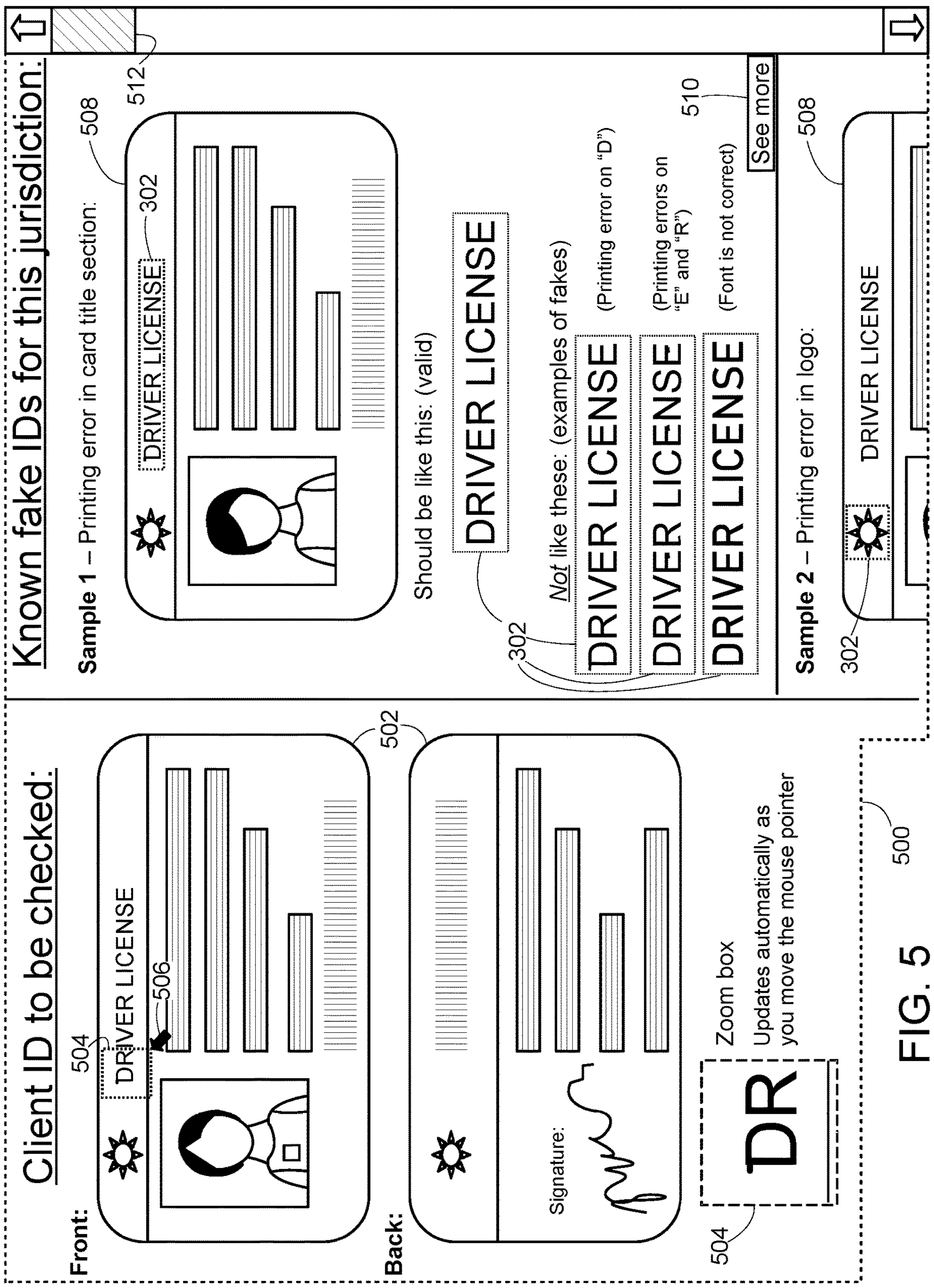
FIG. 5 illustrates a UI screen for assisting a customer service representative validate an identification document of a customer according to an exemplary embodiment.

FIG. 5 illustrates a UI screen 500 for assisting a customer service representative validate an identification document 502 of a customer according to an exemplary embodiment. An example use-case scenario of FIG. 5 may be a bank teller, online seller, or other agent doing a video call with a potential customer and at the same time utilizing the UI screen of FIG. 5 to assist them to authenticate scans of ID cards provided by the potential customer.

The UI screen 500 of FIG. 5 is broken into right and left sides. The left side shows the scans of the front and back of the personal ID card 502 provided by the potential customer. A zoom box 504 is provided allowing the customer service representative to zoom in on portions of the ID images by moving their mouse pointer 506 in order to assist with visual validation. The right side of the UI screen shows known fake IDs 508 for this jurisdiction and card type along with multiple examples of authentication zones 302 confirmed as fake as pulled from the fake ID database 110.

The customer service representative may scroll through different samples of fake ID templates 508 and their associated authentication zone examples 302 for each on the right hand side. A "see more" button 510 is provided to view additional samples of fake authentication zones 302, where the samples 508 are pulled from the fake ID database 110. A scroll bar 512 is also provided on the right side to scroll through different fake samples 508 and authentication zones 302.

A benefit of the UI screen 500 of FIG. 5 is that customer service representatives and other human users who are tasked with verifying new customers can see examples of fake IDs 508 and samples of authentication zones 302 where evidence of counterfeit cards, incorrect pixels and printing errors can be found right on the screen.

The UI screen 500 of FIG. 5 may be generated by an analyst terminal 130 or other external vendor/client system 106. For instance, a computer server may include one or more processors that execute a web server program that generates the UI screen 500 being a webpage and sends to a remote computer operated by the customer service representative. In another example, the UI screen 500 may be generated on a computer by one or more processors of the computer executing a custom application loaded from computer memory.

In some embodiments, the one or more computer processors generating the UI screen 500 of FIG. 5 are configured by the software instructions to automatically select appropriate sample fake ID templates 508 from the fake ID database 110 according to the type of the card 504 on the left hand side (i.e., according to the client ID 504 being checked). The one or more processors may also select and order the fake ID template 508 samples on the right hand side by automatically detecting possible issues and highlighting those on the screen. For instance, the one or more processors generating the UI screen 500 may detect a printing error in the card title section and therefore order the fake samples 508 such that this type of error is positioned at the top of the list. A confidence score representing how likely the ID is to be a valid (or is to be fake) may also be presented in some embodiments on the UI screen 500 of FIG. 5. In some embodiments, the one or more processors generating the UI screen 500 of FIG. 5 are configured to automatically redact sensitive information in UI screen 500 such as names and birthdays and addresses etc. In other cases, whether or not to redact the information may be a user configuration setting.

Although the invention has been described in connection with preferred embodiments, it should be understood that various modifications, additions and alterations may be made to the invention by one skilled in the art without departing from the spirit and scope of the invention.

The above-described functionality such as the steps of the flowchart of FIG. 4 may be implemented by software executed by one or more processors operating pursuant to instructions stored on a tangible computer-readable medium such as a storage device to perform the above-described functions of any or all aspects of the scanner 104, central controller 102, analyst terminal 130, external vendor controller 118, external system 106, etc. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the scanner 104, central controller 102, analyst terminal 130, external vendor controller 118, external system 106 or any of the above-described devices as a result of executing the instructions.

In other embodiments, rather than being software modules executed by one or more processors, the above-described functionality may be implemented as hardware modules configured to perform the above-described functions. Examples of hardware modules include combinations of logic gates, integrated circuits, field programmable gate arrays, and application specific integrated circuits, and other analog and digital circuit designs.

Functions of single devices may be separated into multiple units, or the functions of multiple devices may be combined into a single unit. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A system for collecting information of fake identification documents and providing access thereto by a plurality of external systems, the system comprising:

a central controller having one or more processors coupled to one or more storage devices and one or more communication interfaces; and an analyst terminal coupled to the one or more communication interfaces of the central controller;

wherein the one or more communication interfaces of the central controller are further coupled to the plurality of external systems and to a plurality of scanners via one or more computer networks, wherein at least some of the scanners are located at different venues where identification documents of users of the different venues are being scanned; and by executing a plurality of software instructions loaded from the one or more storage devices, the one or more processors of the central controller are configured to:

receive a respective image data and metadata for each of a plurality of different identification documents scanned by the plurality of scanners via the one or more computer networks;

determine whether each of the different identification documents is a fake;

when determining that a particular one of the different identification documents is a fake, add the respective image data and metadata for the particular one of the different identification documents as a fake ID template to a database stored in the one or more storage devices, whereby, over time, the database accumulates a plurality of fake ID templates as more and more of the different identification documents scanned by the scanners are confirmed fake; and provide access to the database by the plurality of external system over the one or more computer networks such that each of the plurality of external systems is able to retrieve the plurality of fake ID templates from the database, and wherein the one or more processors of the central controller are configured to:

determine whether each of the different identification documents is a fake at least in part by sending the respective image data and metadata for the particular one of the different identification documents to the analyst terminal for display, thereby enabling a human analyst to analyze the respective image data and metadata;

receive information back from the analyst terminal about whether the particular one of the different identification documents is judged to be a fake by the human analyst, and wherein the information received back from the analyst terminal includes one or more coordinates of an authentication zone specifying where an image scan of an identification document of a particular type may be checked as being fake as drawn by the human analyst, the authentication zone being saved as a part of the fake ID template in the database.

2. The system of claim 1, wherein the one or more processors of the central controller are configured to send the respective image data and metadata received for all of the different identification documents to the analyst terminal for human analyst review.

3. The system of claim 1, wherein, for each respective image data and metadata of the plurality of different identification documents received from the scanners, the one or more processors of the central controller are configured to automatically determine whether or not to send the respective image data and metadata to the analyst terminal for human analyst review.

4. The system of claim 1, wherein the one or more processors of the central controller are configured to determine whether each of the different identification documents is a fake at least in part by running an authentication algorithm to check the respective image data and metadata received by one of the scanners according to one or more of the fake ID templates in the database.

5. The system of claim 1, wherein the one or more processors of the central controller are configured to automatically notify the one or more of the external systems after adding the fake ID template to the database.

6. The system of claim 1, comprising:

a first scanner being one of the plurality of scanners coupled to the central controller;

wherein the first scanner is configured to automatically send the respective image data and metadata of an identification document scanned by the first scanner to the central controller in response to the first scanner determining that the identification document is a fake.

7. The system of claim 1, comprising:

a first scanner being one of the plurality of scanners coupled to the central controller;

wherein the first scanner provides a user interface for a human operator of the first scanner to cause the first scanner to send the respective image data and metadata of an identification document scanned by the first scanner to the central controller regardless of whether or not the first scanner automatically determines the identification document to be a fake.

8. The system of claim 1, comprising:

a first scanner being one of the plurality of scanners coupled to the central controller;

wherein, in an audit mode, the first scanner is configured to send the respective image data and metadata for all identification documents scanned by the first scanner to the central controller.

9. The system of claim 1, wherein at least a part of the respective image data and metadata for each of the plurality of different identification documents includes one or more image files for either or both of a front and a back of an identification document scanned by one of the scanners.

10. A central controller in a system for collecting information of fake identification documents and providing access thereto by a plurality of external systems, the central controller comprising:

one or more communication interfaces;

one or more storage devices; and one or more processors coupled to the one or more storage devices and the one or more communication interfaces;

wherein the one or more communication interfaces are further coupled to the plurality of external systems and to a plurality of scanners via one or more computer networks, wherein at least some of the scanners are located at different venues where identification documents of users of the different venues are being scanned; and by executing a plurality of software instructions loaded from the one or more storage devices, the one or more processors are configured to:

receive a respective image data and metadata for each of a plurality of different identification documents scanned by the plurality of scanners via the one or more computer networks;

determine whether each of the different identification documents is a fake;

when determining that a particular one of the different identification documents is a fake, add the respective image data and metadata for the particular one of the different identification documents as a fake ID template to a database stored in the one or more storage devices, whereby, over time, the database accumulates a plurality of fake ID templates as more and more of the different identification documents scanned by the scanners are confirmed fake; and provide access to the database by the plurality of external system over the one or more computer networks such that each of the plurality of external systems is able to retrieve the plurality of fake ID templates from the database, wherein:

the one or more communication interfaces are further coupled to an analyst terminal;

the one or more processors are configured to determine whether each of the different identification documents is a fake at least in part by sending the respective image data and metadata for the particular one of the different identification documents to the analyst terminal for display, thereby enabling a human analyst to analyze the respective image data and metadata;

the one or more processors are configured to receive information back from the analyst terminal about whether the particular one of the different identification documents is judged to be a fake by the human analyst; and and wherein the one or more processors are configured to:

update an authentication algorithm at least according to the fake ID template added to the database to thereby form an updated authentication algorithm for detecting fake identification documents; and send the updated authentication algorithm to at least one of the scanners via the one or more computer networks; whereby the at least one of the scanners installs the updated authentication algorithm and utilizes the updated authentication algorithm to automatically check subsequent identification documents scanned by the at least one of the scanners for fakes.

11. The central controller of claim 10, wherein the one or more processors are configured to send the respective image data and metadata received for all of the different identification documents to the analyst terminal for human analyst review.

12. A method of collecting information of fake identification documents and providing access thereto by a plurality of external systems, the method comprising:

receiving, by a central controller, a respective image data and metadata for each of a plurality of different identification documents scanned by a plurality of scanners via one or more computer networks, wherein at least some of the scanners are located at different venues where identification documents of users of the different venues are being scanned;

determining whether each of the different identification documents is a fake;

when determining that a particular one of the different identification documents is a fake, adding, by the central controller, the respective image data and metadata for the particular one of the different identification documents as a fake ID template to a database stored in one or more storage devices, whereby, over time, the database accumulates a plurality of fake ID templates as more and more of the different identification documents scanned by the scanners are confirmed fake; and providing access to the database by the plurality of external system over the one or more computer networks such that each of the plurality of external systems is able to retrieve the plurality of fake ID templates from the database, updating an authentication algorithm at least according to the fake ID template added to the database to thereby form an updated authentication algorithm for detecting fake identification documents; and sending the updated authentication algorithm to at least one of the scanners via the one or more computer networks; whereby the at least one of the scanners installs the updated authentication algorithm and utilizes the updated authentication algorithm to automatically check subsequent identification documents scanned by the at least one of the scanners for fakes.

13. The method of claim 12, wherein determining whether each of the different identification documents is a fake at least comprises:

sending the respective image data and metadata for the particular one of the different identification documents from the central controller to an analyst terminal for display, thereby enabling a human analyst to analyze the respective image data and metadata; and receiving information back from the analyst terminal about whether the particular one of the different identification documents is judged to be a fake by the human analyst.

14. A system for collecting information of fake identification documents and providing access thereto by a plurality of external systems, the system comprising:

a central controller having one or more processors coupled to one or more storage devices and one or more communication interfaces;

wherein the one or more communication interfaces of the central controller are further coupled to the plurality of external systems and to a plurality of scanners via one or more computer networks, wherein at least some of the scanners are located at different venues where identification documents of users of the different venues are being scanned; and by executing a plurality of software instructions loaded from the one or more storage devices, the one or more processors of the central controller are configured to:

receive a respective image data and metadata for each of a plurality of different identification documents scanned by the plurality of scanners via the one or more computer networks;

determine whether each of the different identification documents is a fake;

when determining that a particular one of the different identification documents is a fake, add the respective image data and metadata for the particular one of the different identification documents as a fake ID template to a database stored in the one or more storage devices, whereby, over time, the database accumulates a plurality of fake ID templates as more and more of the different identification documents scanned by the scanners are confirmed fake; and provide access to the database by the plurality of external system over the one or more computer networks such that each of the plurality of external systems is able to retrieve the plurality of fake ID templates from the database, wherein the one or more processors of the central controller are configured to update an authentication algorithm at least according to the fake ID template added to the database to thereby form an updated authentication algorithm for detecting fake identification documents; and when determining that a particular one of the different identification documents is a fake, adding, by the central controller, the respective image data and metadata for the particular one of the different identification documents as a fake ID template to a database stored in one or more storage devices, whereby, over time, the database accumulates a plurality of fake ID templates as more and more of the different identification documents scanned by the scanners are confirmed fake; and the one or more processors of the central controller are further configured to send the updated authentication algorithm to at least one of the scanners via the one or more computer networks; whereby the at least one of the scanners installs the updated authentication algorithm and utilizes the updated authentication algorithm to automatically check subsequent identification documents scanned by the at least one of the scanners for fakes.

15. A system for collecting information of fake identification documents and providing access thereto by a plurality of external systems, the system comprising:

a central controller having one or more processors coupled to one or more storage devices and one or more communication interfaces;

wherein the one or more communication interfaces of the central controller are further coupled to the plurality of external systems and to a plurality of scanners via one or more computer networks, wherein at least some of the scanners are located at different venues where identification documents of users of the different venues are being scanned; and by executing a plurality of software instructions loaded from the one or more storage devices, the one or more processors of the central controller are configured to:

receive a respective image data and metadata for each of a plurality of different identification documents scanned by the plurality of scanners via the one or more computer networks;

determine whether each of the different identification documents is a fake;

when determining that a particular one of the different identification documents is a fake, add the respective image data and metadata for the particular one of the different identification documents as a fake ID template to a database stored in the one or more storage devices, whereby, over time, the database accumulates a plurality of fake ID templates as more and more of the different identification documents scanned by the scanners are confirmed fake; and provide access to the database by the plurality of external system over the one or more computer networks such that each of the plurality of external systems is able to retrieve the plurality of fake ID templates from the database, wherein at least a part of the respective image data and metadata for each of the plurality of different identification documents comprises metadata specifying: a) reasons entered when an operator of a scanner that scanned an identification document submits a report that the identification document may be fake, b) an identifier of the scanner or venue at which the scanner that scanned the identification document is located, and c) date and time information.

* * * * *